US 8,302,405 B2

(12) United States Patent
Price et al.

(10) Patent No.: US 8,302,405 B2
(45) Date of Patent: Nov. 6, 2012

(54) DYNAMIC CONTROL OF A GAS TURBINE ENGINE COMPRESSOR DURING RAPID TRANSIENTS

(75) Inventors: Brian John Price, Baie d'Urfe (CA); Louis Demers, Lachine (CA)

(73) Assignee: Rolls-Royce Power Engineering PLC, Derby (GB)

(*) Notice: Subject to any disclaimer, the term of this patent is extended or adjusted under 35 U.S.C. 154(b) by 1417 days.

(21) Appl. No.: 11/974,666

(22) Filed: Oct. 15, 2007

(65) Prior Publication Data
US 2010/0281875 A1 Nov. 11, 2010

Related U.S. Application Data

(60) Provisional application No. 60/851,642, filed on Oct. 13, 2006.

(51) Int. Cl.
*F02C 1/00* (2006.01)
(52) U.S. Cl. ............................. 60/772; 60/794
(58) Field of Classification Search .............. 60/39.091, 60/39.282, 772, 773, 779, 792, 794–795
See application file for complete search history.

(56) References Cited

U.S. PATENT DOCUMENTS

| | | | |
|---|---|---|---|
| 3,972,641 A | 8/1976 | Harner et al. | |
| 4,655,034 A | 4/1987 | Kenison et al. | |
| 4,756,152 A | 7/1988 | Krukoski et al. | |
| 4,991,389 A | 2/1991 | Schafer | |
| 5,174,105 A * | 12/1992 | Hines | 60/774 |
| RE34,388 E | 9/1993 | Dubin et al. | |
| 5,375,412 A * | 12/1994 | Khalid et al. | 60/795 |
| 5,385,012 A | 1/1995 | Rowe | |
| 6,141,951 A | 11/2000 | Krukoski et al. | |
| 6,283,410 B1 * | 9/2001 | Thompson | 244/59 |
| 6,463,730 B1 | 10/2002 | Keller et al. | |
| 6,513,333 B2 | 2/2003 | Sugitani | |
| 7,818,970 B2 * | 10/2010 | Price et al. | 60/782 |
| 2006/0101826 A1 | 5/2006 | Martis et al. | |
| 2007/0125090 A1 * | 6/2007 | Martis et al. | 60/773 |

FOREIGN PATENT DOCUMENTS

GB 1377951 12/1974

* cited by examiner

*Primary Examiner* — Phutthiwat Wongwian
(74) *Attorney, Agent, or Firm* — Kreig DeVault LLP

(57) ABSTRACT

A gas turbine engine is disclosed that has with two or more compressors. A first one of the compressors include a compressor variable geometry mechanism that may be in the form of adjustable vanes, bleed valves, or the like. A first one of the compressors is turned at a first speed and the second one of the compressors is turned at a second speed. The first speed is maintained approximately constant while the second speed varies and position of the compressor variable geometry mechanism is modulated in accordance with the second speed of the second one of the compressors to regulate surge margin for the first one of the compressors.

22 Claims, 4 Drawing Sheets

DYNAMIC CONTROL OF A GAS TURBINE ENGINE COMPRESSOR DURING RAPID TRANSIENTS

CROSS-REFERENCE TO RELATED APPLICATIONS

The present application claims the benefit of U.S. Provisional Patent Application No. 60/851,642 filed Oct. 13, 2006, which is hereby incorporated by reference in its entirety.

BACKGROUND

The present invention relates to gas turbine engine operation, and more particularly, but not exclusively relates to the dynamic control of variable compressor elements during rapid transients.

Designers of axial flow compressors for gas turbine engines typically consider many issues associated with engine fluid flow, including stall and/or surge. A stall generally refers to a breakdown in fluid flow in only some of the stages in a multistage compressor and a surge generally refers to a complete breakdown of smooth fluid flow through the compressor and typically includes fluid flow reversal. The air flow and pressure ratio of the compressor at which a surge occurs tends to vary with compressor speed. A surge line represents the minimum stable air flow which can be obtained at any rotational speed of the subject compressor. Compressors are usually designed to have a surge safety margin between the air flow and pressure ratios at which they will normally be operated and the air flow and pressure ratios at which a surge will occur. This margin may be specified as a working line in terms of compressor pressure ratio versus fluid flow. The available surge margin for a given compressor tends to vary with a number of factors, including: production scatter associated with engine-to-engine variation; engine deterioration and fouling; transient excursions above the steady state working line; and instrument accuracy.

In some applications, control systems to provide this safety margin modulate the position of compressor mechanisms to vary its effective geometry, such as bleed off valves (BOVs) and variable inlet geometry vanes (VIGVs). For gas turbine engines that function as a prime mover of an electric power generator, one or more engine compressors may be constrained to rotate at an approximately constant speed that corresponds to the target frequency of Alternating Current (AC) electricity produced with the generator. Typically, a compressor subject to this constraint is not well-suited to control schemes that are used in other applications. Accordingly, there is a need for further advancements in this area of technology. Such advancements may not only find application to compressors operating at a constant speed, but also those operating with variable speed, and those that may or may not drive an electric power generator.

SUMMARY

One embodiment of the present invention includes a unique technique to control operation of a gas turbine engine. Other embodiments include unique apparatus, devices, systems, and methods to modulate a variable geometry compressor device. Further embodiments, forms, objects, features, advantages, aspects, and benefits of the present application shall become apparent from the detailed description and drawings included herein.

DETAILED DESCRIPTION OF SELECTED EMBODIMENTS

Figure 1:
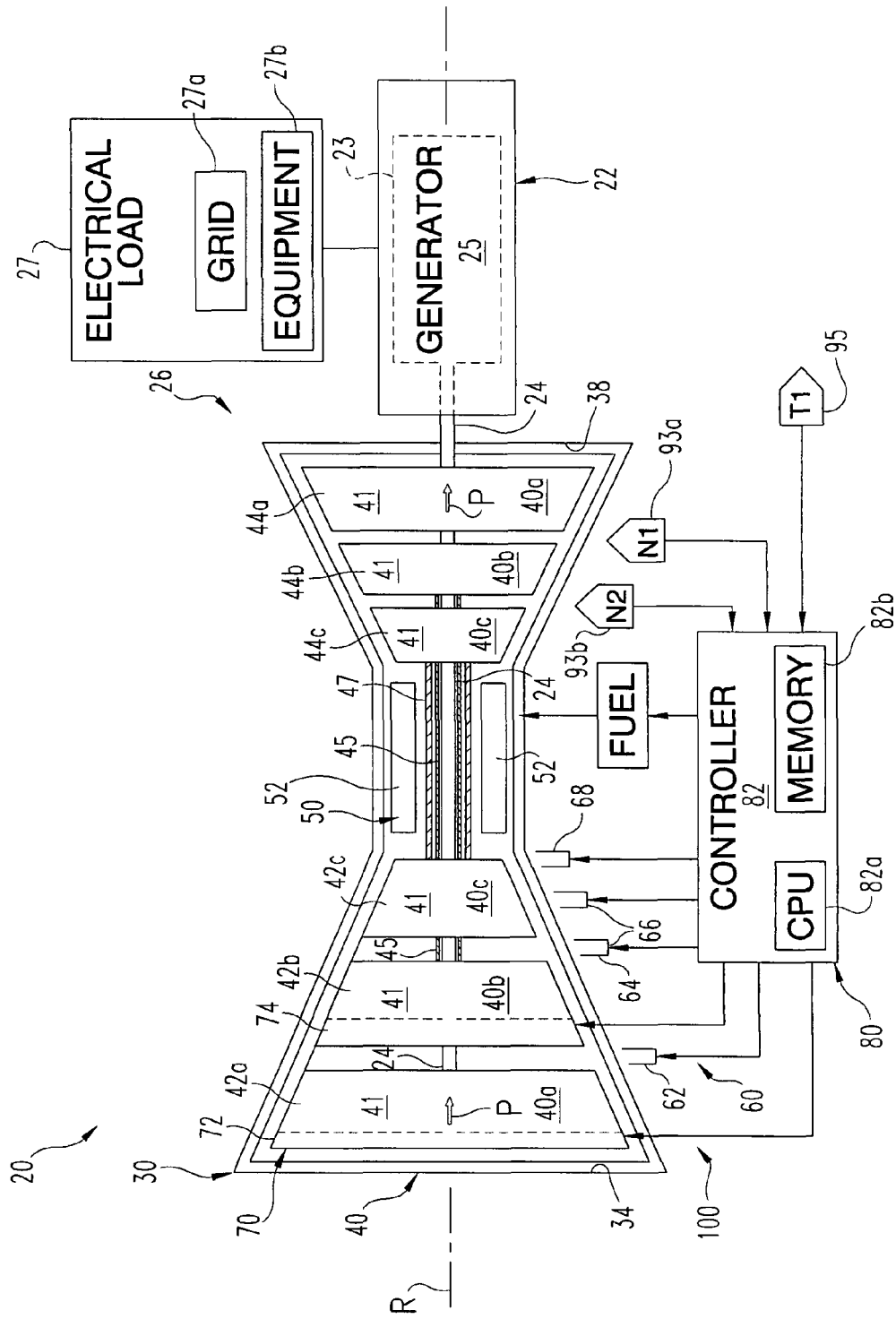
FIG. 1 is a partial, diagrammatic view of a gas turbine engine system for generating electric power.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present application includes a technique to control a compressor to a target surge margin by adjusting the position of variable geometry compressor mechanisms. These variable mechanisms can include one or more bleed off valves (BOVs) and/or variable inlet guide vanes (VIGVs), to name just a couple of examples. In one particular form, BOVs are modulated over a range from an open position at idle to a closed position while VIGVs remain in a minimally opened position; however, once BOVs are closed, the VIGVs are modulated over a range from the minimally opened position to a maximally opened position. For this form, closed BOVs with VIGVs at the "most open" extreme can correspond to a target load level.

FIG. 1 illustrates a gas turbine engine system 20 of another embodiment of the present application. System 20 includes a variable load device 22 that receives mechanical power from a rotating shaft 24. For the depicted embodiment, device 22 is in the form of an electric power generator 25 with generator rotor 23 being driven by shaft 24. System 20 further includes gas turbine engine equipment 26. Shaft 24 mechanically couples the device 22 to the gas turbine engine equipment 26, and provides rotational power to the device 22. Shaft 24 can be directly mechanically connected to the device 22 or can be coupled through one or more gear boxes, clutches, torque converters, transmissions, or a different mechanical linkage as would occur to those skilled in the art. The specific implementation of the shaft coupling typically varies with the nature of the device 22.

Generator 25 provides Alternating Current (AC) electrical power to variable electrical load 27, at a target frequency that is typically desired to remain approximately fixed, such as 50 Hertz (Hz) or 60 Hz. Load 27 includes an electric power supply grid 27a and local equipment 27b both powered by generator 25. Load 27 includes switching to selectively connect and disconnect generator 25 from grid 27a and to selectively connect and disconnect generator 25 from equipment 27b. For this arrangement, load 27 can present rapid step load changes to generator 25 that include a high load of both grid 27a and equipment 27b to a low or medium load of just equipment 27b, as well as no-load to high load, and high load to no-load step changes. Also, the power requirement of grid 27a and/or equipment 27b is subject to change during operation, providing further variability. Accordingly, dynamic changes in loading result in a range of power levels, including a relatively low level. Nonetheless, in other embodiments, load 27 may be dedicated to supplying power to an electric power grid only, may be dedicated to standalone power generation for local equipment only, or a different arrangement.

Equipment 26 includes gas turbine engine 30. The representation of engine 30 is not intended to be limiting and changes in the basic engine configuration, number of stages and additional equipment is contemplated herein. The gas turbine engine 30 will be described generally; however, details regarding standard gas turbine engines will not be presented given that the theory of operation and general parameters of such engines are well-known to those of ordinary skill in the art. Engine 30 includes an air inlet 34 and a discharge outlet 38. Engine 30 defines a working fluid flow path P as symbolized by like-labeled arrows in FIG. 1. Working fluid flow path P flows from the inlet 34 of engine 30 to a working fluid discharge outlet 38 (also schematically depicted). In other applications, a different variable load device is driven by engine 30, such as a pump, construction or earth moving equipment, a land or rail vehicle, an amphibious vehicle, a marine vehicle, or the like—just to name some representative examples. In still other embodiments, device 22 may differ as would occur to those skilled in the art.

The engine 30 includes turbomachinery 40 that comprises a number of rotors 41 connected to a respective shaft to turn about rotational axis R. More specifically, engine 30 includes a triple spool arrangement. The three spools of engine 30 are designated as a low pressure spool 40a, an intermediate pressure spool 40b, and a high pressure spool 40c. Spool 40a includes low pressure compressor 42a coupled to turbine 44a by shaft 24. Spool 40b includes intermediate pressure compressor 42b coupled to turbine 44b by shaft 45. Spool 40c includes high pressure compressor 42c coupled to turbine 44c by shaft 47. Shafts 24, 45, and 47 are concentrically arranged so that spools 40a, 40b, and 40c can rotate independent of one another. It should be appreciated that shaft 24 is coupled to turn with rotor 23 of generator 25. Accordingly, spool 40a (compressor 42a and turbine 44a) turn with rotor 23 of generator 25.

Engine 30 further includes a combustion and fueling subsystem 50. Subsystem 50 includes a number of multistage combustors 52, only two of which are schematically shown in FIG. 1. In one form, each of the combustors 52 includes a combustor structure with a primary stage and one or more other stages, such as a secondary stage and a tertiary stage as described in U.S. Pat. No. 5,743,079 to Walsh et al., which is hereby incorporated by reference. In other forms, more or fewer stages and/or an otherwise differently arranged combustor structure may be utilized. Combustion system 50 is of a Dry Lean Engine (DLE) type; however, in other embodiments it may vary as desired for the corresponding application. For further background on DLE-type combustion, see U.S. Published Patent Application No. 2004/0024516 to Hook et al., which is hereby incorporated by reference. Fuel is provided to combustors 52 with multiple, independently controlled fuel lines to regulate the combustion process, with fuel supply equipment of a standard type.

In one arrangement, the primary combustor stage receives fuel from a corresponding one of the independently controlled fuel lines, and the other stages each include a corresponding independently controllable line. Typically, control of each line is provided by at least one actuator-controlled fuel valve (not shown) that regulates fuel flow to the respective combustor stage.

Engine 30 also includes Compressor Variable Geometry (CVG) mechanisms 100. Mechanisms 100 include air bleed-off devices 60 in the form of a number of bleed valves 62, 64, 66, and 68 to divert air from path P upstream of combustors 52. In one form, bleed devices 62, 64, 66, and 68 correspond to a low pressure compressor exit bleed, intermediate compressor exit bleed, high pressure compressor interstage bleed, and high pressure compressor exit bleed, respectively. However, it should be understood that other bleed device configurations involving more, fewer, and/or different locations or stages could be utilized. Besides the devices 60, mechanisms 100 also include variable position vanes 70 in the form of variable inlet guide vanes 72 and 74. Vanes 72 and 74 are provided for the low pressure compressor 42a and the intermediate pressure compressor 42b, respectively. Other embodiments may have more or fewer variable compressor mechanisms 100 and/or may alternatively or additionally include mechanisms of a different type to alter compressor working fluid flow.

Working fluid sufficient to turn shaft 24 with turbine 44a is provided through standard gas turbine engine operation. Generally, air is drawn through the inlet 34, which is then compressed by the low pressure compressor 42a. The pressurized discharge of the low pressure compressor 42a is further pressurized by the intermediate pressure compressor 42b and then high pressure compressor 42c, which then discharges the working fluid at high pressure to the combustors 52. Fuel is introduced into the working fluid discharged by the high pressure compressor 42c, and ignited within the combustors 52. The expanding gases resulting from this combustion are discharged by the combustors 52 at the inlet to the turbine 44c. In response, the turbine 44c is rotated and correspondingly the shaft 47 rotates, which turns the high pressure compressor 42c to provide persistent operation of the spool 40c. The working fluid discharged from the turbine 44c flows along path P to the inlet of the turbine 44b. The impinging working fluid turns the turbine 44b in a manner like the turbine 44c, causing the shaft 45 to rotate and correspondingly turning the intermediate pressure compressor 42b. The working fluid discharged from turbine 44b flows along path P to the inlet of turbine 44a, which causes it to turn, rotating shaft 24 and correspondingly rotating low pressure compressor 42a. In this manner, the rotation of the compressors 42a, 42b, and 42c is continued by the operation of the combusted working fluid that drives the respective turbines 44a, 44b, and 44c. As the working fluid is discharged from the turbine 44a it exits through outlet 38. The corresponding rotation of shaft 24 drives rotor 23 of generator 25, as previously described. It should be appreciated that this arrangement turns spool 40a and rotor 23 together at a rotational speed corresponding to the frequency of the AC electricity produced with generator 25.

To regulate the operation of the gas turbine engine 30, a control subsystem 80 is provided. Control subsystem 80 includes several input devices (such as sensors) and several output devices (such as actuators) operatively coupled to a controller 82. Controller 82 includes a central processing unit 82a and a memory 82b, and may include other features such as limiters, conditioners, filters, format converters, or the like which are not shown to preserve clarity. An operator input device (not shown) can also be coupled to the controller 82 to provide corresponding operator input to adjust/direct one or more aspects of engine operation. A display, audible alarm, warning light(s), or the like (not shown) can also be coupled to the controller 82 that each respond to various output signals from controller 82.

Controller 82 is comprised of one or more components that may be configured as a single unit, or distributed among two or more units. The processing unit 82a and/or the memory 82b may be combined in a common integrated circuit, defined by separate circuitry, or comprised of one or more other component types of a solid state, electromagnetic, optical, or different variety as would occur to those skilled in the art. The controller 82 may include analog circuitry, digital circuitry, and/or a hybrid combination of both of these types. In one form, the controller 82 is of the programmable variety that executes algorithms and processes data in accordance with operating logic that is defined by programming instructions (such as software or firmware). Alternatively or additionally, operating logic for controller 82 is at least partially defined by hardwired logic or other hardware. In one particular form, the controller 82 is configured to operate as a Full Authority Digital Engine Control (FADEC); however, in other embodiments it may be organized/configured in a different manner as would occur to those skilled in the art.

Subsystem 80 also includes a number of sensors to provide input to controller 82. Some of these inputs are illustrated in FIG. 1. For example, sensors 93a and 93b detect rotation of the low pressure spool 40a and intermediate pressure spool 40b to determine the rotational speed of each. The resulting speed signals are N1 and N2 for spools 40a and 40b, respectively. It should be appreciated that under normal operating conditions, the rotational speed of spool 40a is less than spool 40b, and the rotational speed of spool 40b is less than spool 40c. Subsystem 80 also includes temperature sensor 95 coupled to controller 82 from which ambient temperature of the working fluid is provided as signal T1. Signal T1 can be used to provide a corrected speed signal as further described hereinafter in connection with FIG. 4. Typically, gas turbine engine equipment includes other sensors directed to temperature, pressure, humidity, and the like; as well as other actuators to perform desired operations, but are not shown in FIG. 1 to preserve clarity. It should further be understood that controller 82 provides an output corresponding to fuel flow through various controllable fuel lines of subsystem 50. Also, the setting of mechanisms 100, including the degree they are opened or closed (as applicable), is provided by feedback to controller 82 and/or can be inferred from information otherwise available to controller 82.

In an alternative embodiment, a gas turbine engine with a dual spool arrangement is utilized instead of a triple spool. In still another arrangement, more than three spools are used and the shaft to drive device 22 is the same as the shaft belonging to one of the spools or is mechanically linked thereto. Likewise, the variable geometry compressor mechanisms can vary with more, fewer, or differently arranged devices and/or the arrangement of subsystem 50 can differ. In another alternative embodiment, generator 25 can be coupled to spool 40a closer to compressor 42a than turbine 44a.

Figure 2:
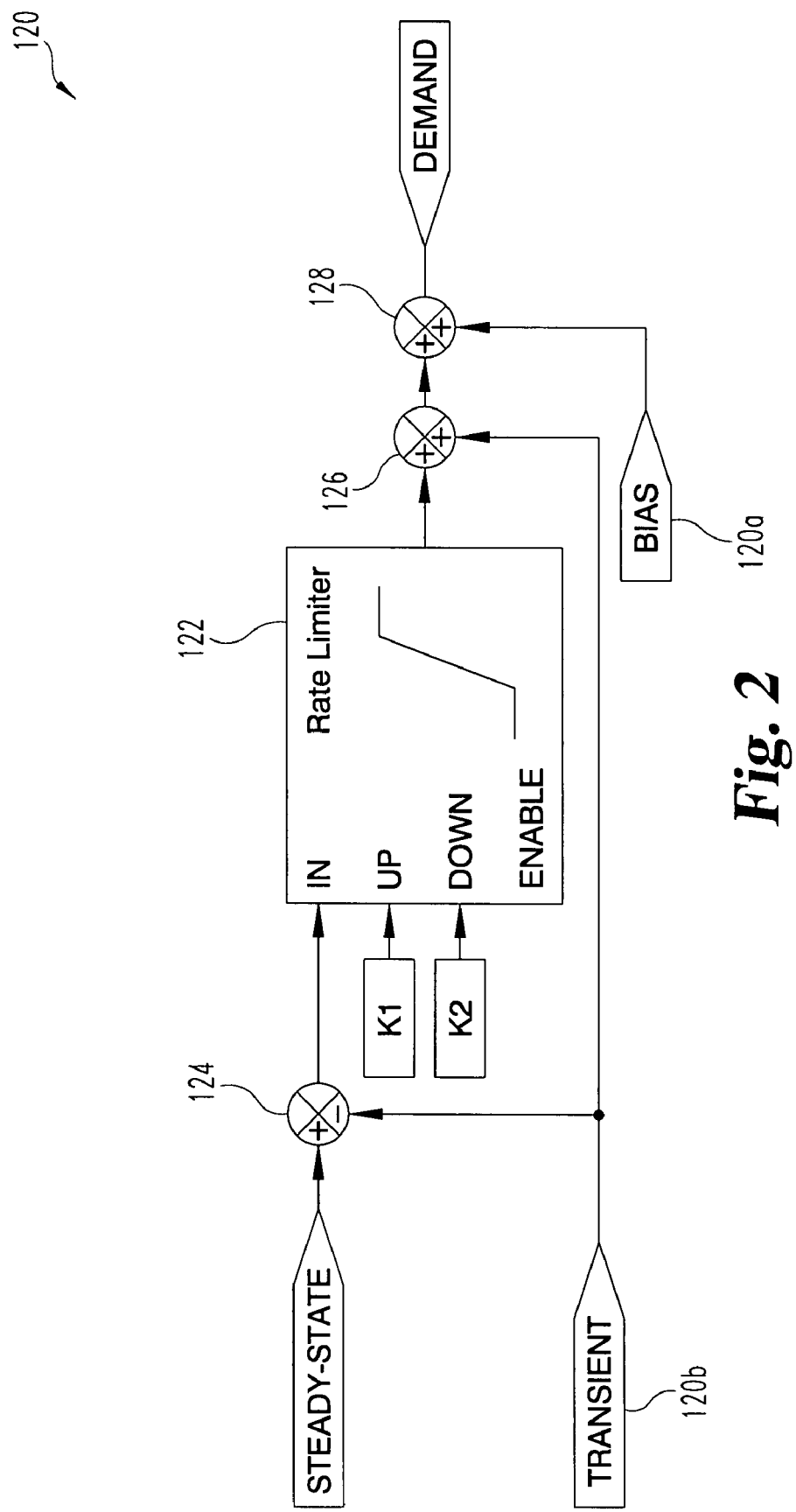
FIG. 2 is a diagrammatic view of control logic for modulation of a variable geometry compressor mechanism.
Figure 3:
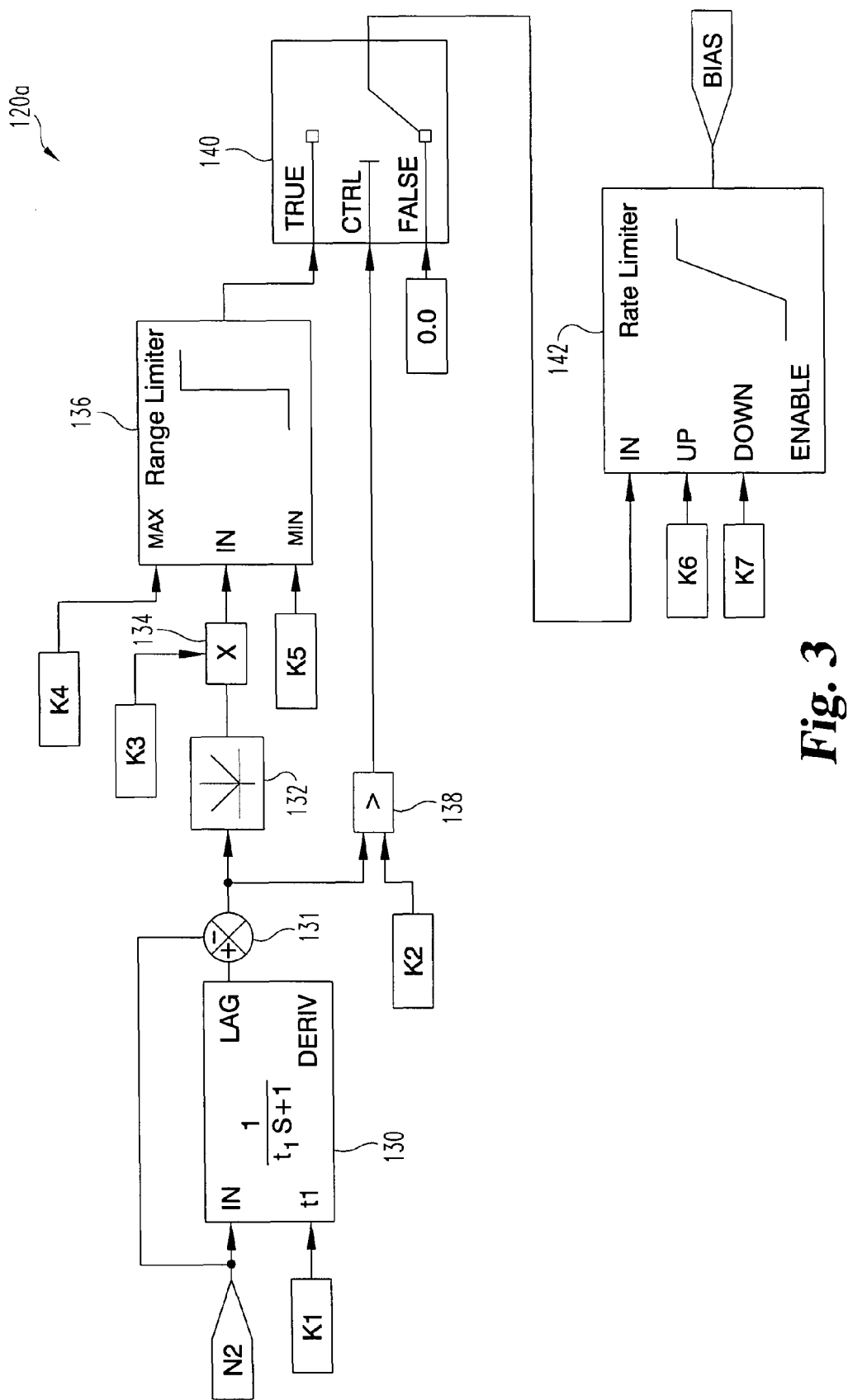
FIG. 3 is a diagrammatic view of bias adjustment for the control logic of FIG. 2.
Figure 4:
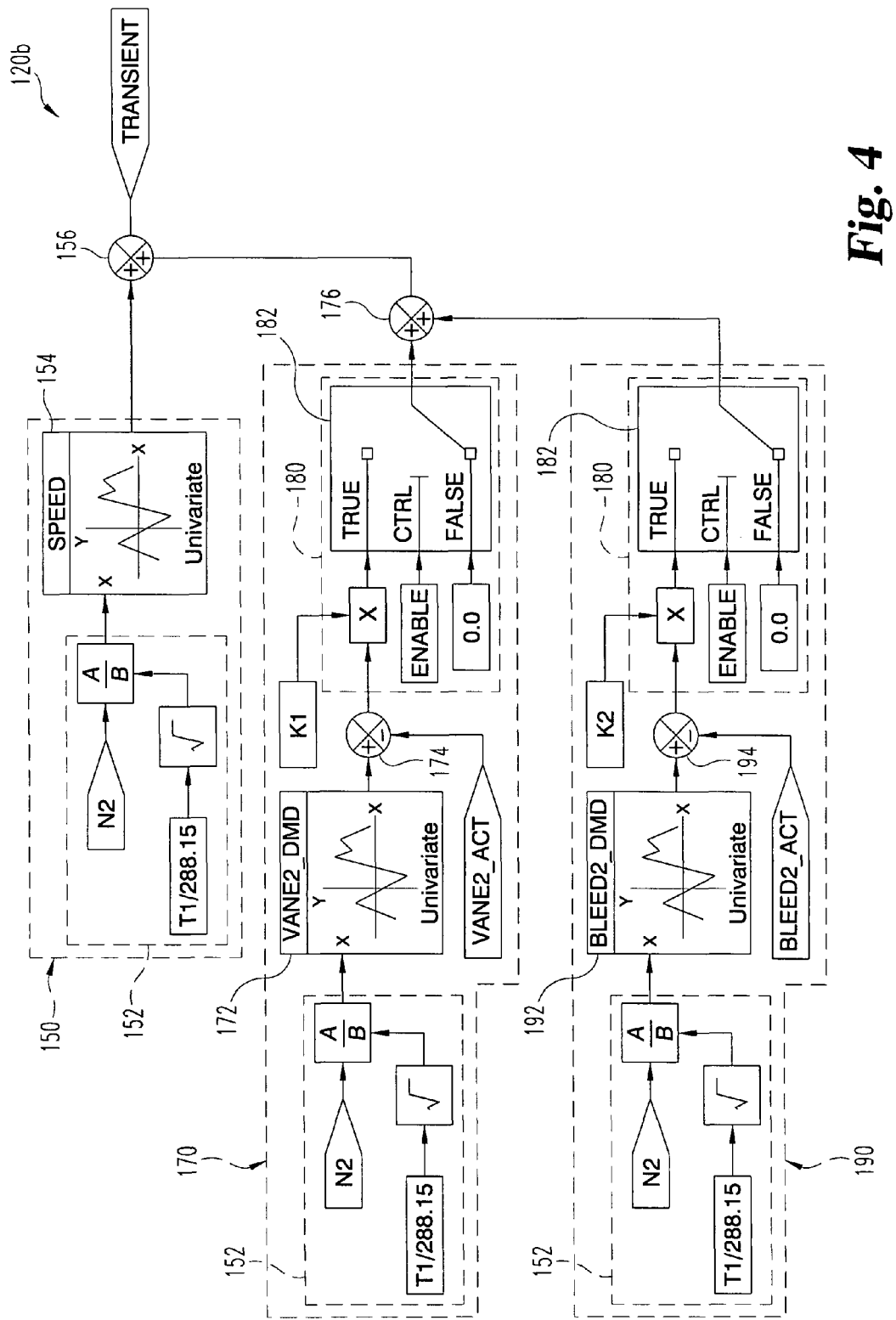
FIG. 4 is a diagrammatic view of transient adjustment for the control logic of FIG. 2.

Referring to FIGS. 2-4, control logic 120 is schematically illustrated. Control logic 120 is executed as operating logic of controller 82, and may be implemented through programming, hardware, or a combination of both, for example. The mechanical connection of the spool 40a to turn with generator 25 results in the low pressure compressor 42a operating at an approximately fixed speed during steady state operation in correspondence to the frequency of the AC electricity output. This configuration is typically desired in terms of power and efficiency; however, it can lead to potential challenges in terms of surge margin control for the low pressure compressor 42a. To meet these challenges mechanisms 100 associated with low pressure compressor 42a can be modulated according to a desired schedule to regulate surge margin. One particular challenge is posed by the transients resulting from step reductions or increases in the electrical load 27 on the generator 25. Typically, the size of the step increase or decrease, and hence the final power level is not necessarily known at the onset of the step, which is particularly prevalent in situations where the generator 25 operates on an isolated or small grid, or in cases where the generator 25 normally operates on a large grid but, when disconnected from the large grid, is still required to provide power to local equipment.

In one implementation, mechanisms 100 are subject to scheduling rapid transient operation to preserve compressor surge margin in a manner that is different than mechanism scheduling during steady operation. During this transient mode of operation, speed of the downstream intermediate pressure compressor 42b is used to schedule position of the mechanisms 100 for the low pressure compressor 42a, namely, bleed valves 62 and vanes 72. In contrast, during steady state operation there are typically additional requirements, for example to maximize power, efficiency and/or engine life, which can require different vane and bleed scheduling than that desired for transient operation. An example of one nonlimiting form of steady state schedule is described in U.S. Published Patent Application No. 2005/000271413, which is hereby incorporated by reference. Control logic 120 provides a way to define the steady state and new transient schedules and integrate them in a single control protocol. Per control logic 120 shown in FIG. 2, both the transient and steady state schedules are calculated, but it is the transient schedule that always provides the schedule base. The steady state schedule is used as an input to calculate the bias to be applied to this base schedule.

Referring to FIG. 2, control logic 120 is schematically shown. Logic 120 defines a technique to adjust the scheduled position of a low pressure mechanism such as vanes 72, by summing a bias signal adjustment from logic 120a (BIAS) and a transient signal bias adjustment from logic 120b (TRANSIENT) to provide the output command signal DEMAND. During steady state operation or during a slow transient manoeuvre, logic 120 biases the output of the transient schedule to equal that of the steady state schedule. The rate limit of the bias is set to facilitate this approach via limits K1 and K2 input to rate limiter 122 of logic 120, as further defined hereinafter. For logic 120, K1 and K2 provide rate limits for the limiter 122, that are applied to the difference between the STEADY-STATE and TRANSIENT Schedule values as generated by a difference operator 124. The output of the limiter 122 is input to a sum operator 126 to add the value for TRANSIENT. The output of the sum operator 126 is input to a sum operator 128 to which BIAS from logic 120a is added to provide DEMAND as the output. Via these operators, the net result is approximately the same as following the steady state schedule. During a rapid transient, however, the vanes 72 and valves 62 follow the rapid change in speed of compressor 42b via the TRANSIENT schedule. The rate limit on the bias is such that it cannot bias the final output to the steady state schedule. In effect, the engine 30 follows the steady state schedule when it is in (or close to) steady operation, hence maximizing power, efficiency or life; but following the TRANSIENT schedule and preserving compressor surge margins during transient operation. This approach also decouples the steady state scheduling from the TRANSIENT scheduling, which facilitates independent derivation based on the different corresponding requirements. Logic 120, via the rate limiter 122, provides for a smooth transition between the STEADY-STATE and TRANSIENT schedule operation, which aids engine 30 stability. The parameter names and symbols used in FIG. 2 are as follows in Table I:

TABLE I

| Parameter | Description |
| --- | --- |
| K1 | Rate UP of the trim difference between steady-state and transient schedules |
| K2 | Rate DOWN of the trim difference between steady-state and transient schedules |
| STEADY-STATE | Steady-State schedule for the subject compressor vane |
| TRANSIENT | Subject Compressor Vane schedule during engine transient |
| BIAS | Subject Compressor Bias adjustment due to system lag |
| DEMAND | Subject Compressor Vane position final demand |

FIG. 3 illustrates bias adjustment control logic 120a in greater detail. The actuation systems for the vanes 72 and/or valves 62 may be such that the actual position lags that of the demand. Logic 120 compensates for any such system lag by biasing the demand in the safe direction for compressor surge margin. The size of the bias is determined as a function of the absolute difference between the actual downstream compressor speed and a lagged version of the downstream compressor speed as generated by derivative operator 130 and difference operator 131. The output of the difference operator 131 is input to operator 132 and a "greater than" operator (">") 138. The output of operator 132 is input to the multiplication operator 134 along with the parameter K3. The output of the multiplication operator 134 is provided as the test input to range limiter 136. The range limits for this limiter 136 are provided as parameter K4 and K5. The output of the limiter 136 is provided to the "TRUE" pole input to a logical switch operator 140.

For comparison to the output of the difference operator 131 a threshold value, K2, is input to the operator 138. The yes/no (Boolean) output of the "greater than" test of the operator 138 is provided to the selection (or control=CNTL) input of the switch operator 140. Zero (0.0) is input to the "FALSE" pole of switch operator 140. Thus, the (FALSE) output of switch operator 140 is zero (FALSE) (as shown) when K2 is greater than the output of the operator 131 (as tested by operator 138), and otherwise it is set to the output of the limiter 136 (TRUE). The time constant for the lag (K1), the ratio of bias to speed difference, and a maximum level of bias can be set individually. They are determined to provide a bias large enough to be reached sufficiently quickly during a rapid transient, but that does not result in instability during steady state operation or in the period following a rapid transient. The bias is a function of the downstream compressor speed (N2) such that the faster N2 changes, the faster the working line (and desired surge margin) changes, so the faster the bias needs to be applied to compensate for actuator lag. The parameter names and symbols used in FIG. 3 are as follows in Table II:

TABLE II

| Parameter | Description |
| --- | --- |
| K1 | Time constant for speed downstream signal filtering |
| K2 | Threshold to enable the downstream speed correction |
| K3 | Proportional on absolute downstream speed delta |
| K4 | Maximum authority of the downstream speed correction |
| K5 | Minimum authority of the downstream speed correction |
| K6 | Rate UP of the downstream speed correction |
| K7 | Rate DOWN of the downstream speed correction |

TABLE II-continued

| Parameter | Description |
| --- | --- |
| N2 | Downstream compressor speed |
| BIAS | Subject Compressor Bias adjustment due to system lag |

The output of switch operator 140 is input to rate limiter 142 which has K6 and K7 as its upward and downward rate limits. Rate limiter 142 outputs the BIAS adjustment that is used in logic 120 as previously described.

FIG. 4 illustrates transient control logic 120b. In some applications, the downstream compressor may itself be fitted with variable vanes and bleeds—such is the case illustrated in FIG. 1. For this arrangement, the inlet flow of compressor 42b (equals the outlet flow of the subject compressor 42a) is dependent on both the speed and the position of mechanisms 100 for compressor 42b, which are vanes 74 and valves 64. If the position of these mechanisms 100 (vanes 74 and valves 64) versus corrected speed relationship does not remain fixed, either via a different scheduling parameter or via lags in the actuation, then the scheduling for the low pressure compressor 42a needs to also account for the variation in the intermediate compressor 42b mechanisms 100. This accounting can be achieved by separate adjustment of the schedule applicable in transient operation of the engine 30. Three separate adjustments can be made, one as a function of the corrected speed N2, one for the vane position and a third one for the bleed opened, all from compressor 42b. The parameter names and symbols used in FIG. 2 are as follows in Table III:

TABLE III

| Parameter | Description |
| --- | --- |
| K1 | Correction for Downstream Compressor Vane schedule |
| K2 | Correction for number of Downstream Compressor Bleed |
| ENABLE | Enabling of correction |
| N2 | Downstream Compressor speed |
| T1 | Ambient Temperature |
| VANE2_DMD | Downstream Vane Ideal position |
| VANE2_ACT | Downstream Vane position feedback |
| BLEED2_DMD | Downstream Bleed Ideal position |
| BLEED2_ACT | Downstream Bleed position command/feedback |
| TRANSIENT | Subject Compressor Vane schedule during engine transient |

These three adjustments of the transient control logic 120b are designated corrected N2 speed adjustment operator 150, vane position adjustment operator 170, and bleed adjustment operator 190. The operators are collectively summed together by sum operators 156 and 176 to provide the output TRANSIENT. The speed adjustment operator 150 includes N2 speed correction operator 152, which is also included in the adjustment operators 170 and 190, such that all of the adjustment operators 150, 170, and 190 use corrected speed as inputs. For the speed adjustment operator 150, the output of the speed correction operator 152 is provided as an input to speed adjustment schedule 154, which outputs the desired correction to sum operator 156.

The vane position adjustment operator 170 receives the corrected speed as input to a vane adjustment schedule 172 which provides ideal vane position (VANE2_DMD) as output. A difference operator 174 subtracts the actual vane position (VANE2_ACT) from the ideal position (VANE2_DMD-VANE2_ACT) to provide the resulting difference to logical switch operator 180. The switch operator 180 multiples the output of the difference operator 174 by vane correction factor K1 of Table III and provides the result to the "TRUE" pole of logical switch 182. The logical switch 182 provides its TRUE pole as output unless correction is not enabled as determined by logic variable ENABLE. When not enabled, the "FALSE" pole value is output, which is zero (0.0) (the depicted position).

The bleed adjustment operator 190 is analogous to the operator 170, except a schedule 192 outputs BLEED2_DMD to a difference operator 194 for subtraction of BLEED2_ACT (instead of the VANE2_DMD and VANE2_ACT positions of operator 170), and the factor K2 (correction for bleed) is the multiplier applied to the output of difference operator 194.

While logic 120b has been developed to integrate the steady state and transient schedules for vane and bleed positions, it can be applied to integrate and decouple any two schedules derived to meet different requirements in different areas of operation. Taken together, logic 120 provides a method for scheduling vanes and bleed on a compressor operating at a fixed speed to preserve compressor surge margin during rapid transients, while allowing an independent scheduling methodology to maximize power, efficiency and life during steady state operation.

Many other embodiments of the present application are envisioned. For example, a further embodiment includes: driving an electric power generator with a gas turbine engine including two or more compressors to produce A/C electricity, the first one of the compressors including a compressor variable geometry mechanism; and regulating operation of the first one of the compressors to a desired surge margin. This regulation may include: determining rotational speed of the second one of the compressors; and adjusting the compressor variable geometry mechanism to a target position as a function of the rotational speed of the second one of the compressors.

In another example, an embodiment of the present application includes: operating a gas turbine engine including two or more compressors with the first one of the compressors including a compressor variable geometry mechanism; regulating operation of the first one of the compressors to a desired surge margin and the compressor variable geometry mechanism to a target position as a function of rotational speed of the second one of the compressors.

A further example includes a gas turbine engine with means for driving an electric power generator. The gas turbine engine further includes two or more compressors with a first one of the compressors including a compressor variable geometry mechanism. Also included are means for regulating operation of the first one of the compressors to a desired surge margin and means for adjusting the compressor variable geometry mechanism to a target position as a function of rotational speed of the second one of the compressors.

Still another embodiment of the present application includes: operating a gas turbine engine with two or more compressors, a first one of the compressors including a compressor variable geometry mechanism; turning the first one of the compressors at a first speed and a second one of the compressors at a second speed; maintaining the first speed approximately constant relative to the second speed and modulating position of the compressor variable geometry mechanism in accordance with the second speed to regulate surge margin.

Yet another embodiment includes a gas turbine engine with two or more compressors. A first one of the compressors includes a compressor variable geometry mechanism. Also included are: means for turning a first one of the compressors at a first speed and a second one of the compressors at a second speed; means for maintaining the first speed approximately constant while the second speed varies; and means for modulating position of the compressor variable geometry mechanism in accordance with the second speed to regulate surge margin.

In another embodiment, an apparatus comprises: a gas turbine engine including two or more compressors, with a first one of the compressors including a compressor variable geometry mechanism. The apparatus also includes a sensor to provide one or more sensor signals corresponding to rotational speed of the second one of the compressors, and a controller operatively coupled to the sensor. This controller includes operating logic responsive to the signal to regulate surge margin of the first one of the compressors. This logic is further structured to select a target position of the compressor variable geometry mechanism as a function of the one or more sensor signals and generate one or more corresponding output signals. The compressor variable geometry mechanism is responsive to the one or more corresponding output signals to adjust to the target position.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   driving an electric power generator with a gas turbine engine including two or more compressors to produce AC electricity, a first one of the compressors including a compressor variable geometry mechanism;
   regulating operation of the first one of the compressors to a desired surge margin, which includes:
      determining rotational speed of a second one of the compressors, wherein the second one of the compressors is downstream of the first one of the compressors; and
      adjusting the compressor variable geometry mechanism to a target position as a function of the rotational speed of the second one of the compressors.

2. The method of claim 1, the adjusting the compressor variable mechanism includes correcting for ambient temperature.

3. The method of claim 1, wherein the compressor variable geometry mechanism includes at least one of a variable position vane and a compressor bleed device.

4. The method of claim 1, which includes rotating the first one of the compressors at a rotational speed less than the rotational speed of the second one of the compressors, the electric power generator being mechanically connected to the first one of the compressors to turn therewith.

5. The method of claim 4, which includes varying the rotational speed of the second one of the compressors over a range while the rotational speed of the first one of the compressors remains generally constant in proportion to a target frequency of the AC electricity.

6. The method of claim 1, which includes:
performing the regulating of the first one of the compressors to address a transient state operation;
during steady state operation, changing regulation of the first one of the compressors to a different mode than the regulating of the first one of the compressors for the transient state operation.

7. The method of claim 1, wherein the compressor variable geometry mechanism is one of a plurality to variable mechanisms including a number of bleed off valves and a number of variable inlet guide vanes and further comprising:
adjusting position of the variable inlet guide vanes in response to a transient operating condition based on the rotational speed of the second one of the compressors.

8. The method of claim 1, wherein the regulating of the operation of the first one of the compressors includes biasing the target position to account for a time lag between actual and observed speed of the second one of the compressors.

9. The method of claim 1, wherein the second one of the compressors includes one or more
adjustable compressor mechanisms and the regulating of the operation of the first one of the compressors includes accounting for operation of the one or more adjustable compressor mechanisms.

10. A method comprising:
operating a gas turbine engine with two or more compressors, a first one of the compressors including a compressor variable geometry mechanism;
turning a first one of the compressors at a first speed and a second one of the compressors at a second speed, wherein the second one of the compressors is downstream of the first one of the compressors;
maintaining the first speed approximately constant while the second speed varies; and
modulating position of the compressor variable geometry mechanism in accordance with the second speed to regulate surge margin.

11. The method of claim 10, which further includes a number of other compressor variable geometry mechanisms, and wherein the modulating of the position of the compressor variable geometry mechanism includes determining an adjustment that accounts for a time lag between actual and observed speed of the second one of the compressors and for positioning of the other compressor variable geometry mechanisms.

12. The method of claim 10, wherein the compressor variable geometry mechanism includes at least one of a variable position vane and a compressor bleed device.

13. The method of claim 10, which includes driving an electric power generator with the gas turbine engine to provide AC electricity.

14. The method of claim 13, wherein the first one of the compressors is mechanically coupled to the electric power generator to turn therewith, and the first speed being in proportion to a target frequency of AC electricity, and the first speed being less than the second speed.

15. The method of claim 10, wherein the modulating of the position of the compressor variable geometry mechanism is included in a transient state mode of regulation of the first one of the compressors, and further comprising:
during steady state operation, changing to a steady state mode of regulation of the first one of the compressors different than the transient state mode.

16. The method of claim 10, wherein the compressor variable geometry mechanism a plurality to variable mechanisms including a number of bleed off valves and a number of variable inlet guide vanes.

17. An apparatus, comprising:
a gas turbine engine including two or more compressors, a first one of the compressors including a compressor variable geometry mechanism;
a sensor to provide one or more sensor signals corresponding to rotational speed of a second one of the compressors, and wherein the gas turbine engine is of a multi-spool arrangement with the first one of the compressors being a lower pressure type than the second one of the compressors;
a controller operatively coupled to the sensor, the controller including operating logic responsive to the signal to regulate surge margin of the first one of the compressors, the operating logic being structured to select a target position of the compressor variable geometry mechanism as a function of the one or more sensor signals and generate one or more corresponding output signals; and
wherein the compressor variable geometry mechanism is responsive to the one or more corresponding output signals to adjust to the target position.

18. The apparatus of claim 17, further comprising means for accounting for a time lag between actual and observed speed of the second one of the compressors.

19. The apparatus of claim 17, wherein the second one of the compressors includes one or more other compressor variable geometry mechanisms and further comprising means for accounting for position of the one or more other compressor variable geometry mechanisms.

20. The apparatus of claim 17, further comprising an electric power generator mechanically coupled to the first one of the compressors to turn therewith.

21. The apparatus of claim 20, wherein the compressor variable geometry mechanism includes at least one of a bleed off valve and the variable inlet guide vane.

22. The apparatus of claim 17, further comprising another sensor to detect ambient temperature, the controller being structured to correct the one or more sensor signals in accordance with the ambient temperature.

* * * * *